Figure 1:
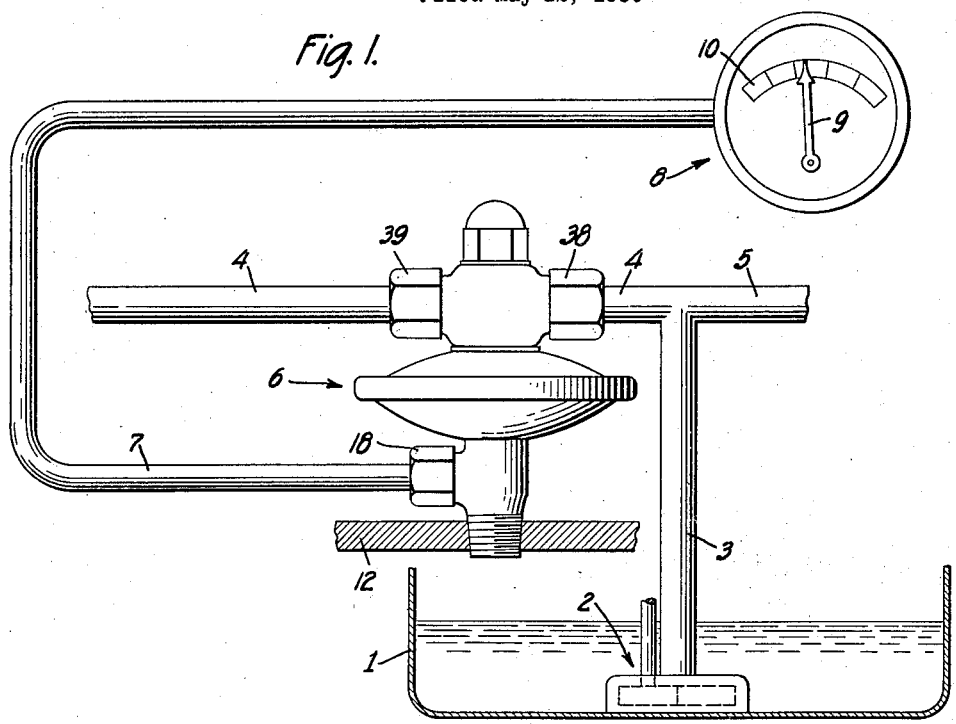

Dec. 3, 1935.    M. E. CHENEY ET AL    2,023,309
VISCOSIMETER
Filed May 12, 1930

Moses E. Cheney and
Aleck W. Meston.
INVENTORS

BY Moses + Nolte
ATTORNEYS

Patented Dec. 3, 1935

2,023,309

UNITED STATES PATENT OFFICE 2,023,309

VISCOSIMETER

Moses E. Cheney, Flushing, and Aleck W. Meston, New York, N. Y., assignors to Moto Meter Gauge & Equipment Corporation, Long Island City, N. Y., a corporation of Delaware Application May 12, 1930, Serial No. 451,602

6 Claims. (Cl. 265—11)

This invention relates to means for measuring the viscosity of liquids, and has for an object to provide an efficient, inexpensive, and rugged device for this purpose. The invention is illustrated and described herein as applied to the lubricating system of a vehicle motor, because of particular advantages which it possesses in such a system. It is to be understood, however, that the invention is of general application.

It is of particular advantage to the motorist to be advised when the crankcase oil has been so diluted as to require replacement. It is the practice at the present time for motorists to operate under an arbitrary rule requiring renewing of the oil after a definite period of operation, for example, after every five hundred miles. The viscosity of the oil is, however, greatly affected by temperature variation and by the particular motor, being especially subject to dilution by the motor fuel in motors equipped with leaky piston rings. In many instances the discarding of the old oil at the conclusion of five hundred miles' operation represents a waste of lubricant which is still in a condition to function efficiently for many miles more. In other motors the retention of the oil until the end of five hundred miles' operation is highly detrimental to the motor, because the oil has ceased to function efficiently long before the stated number of miles have been run. Moreover, in many cases oils of improper temperature-viscosity characteristics for meeting certain operating conditions are used with detrimental effect to the bearing surfaces. For example, when a motor in which the oil temperature normally becomes comparatively high is given severe service in a hot climate the viscosity may drop below safe limits and result in rapid wear to moving parts.

It is therefore of value to the motorist to be warned of the approach of this condition.

In an instrument designed for automotive use it is important that the instrument be of simple and inexpensive design because of great saving where production is on a scale to meet the demands of the industry. It is also important that the instrument be of sturdy construction because of the vibration and strain to which the instrument is subjected by the motion of the vehicle. The instrument disclosed herein is well adapted to meet these requirements.

Other objects and advantages will hereinafter appear.

Figure 2:
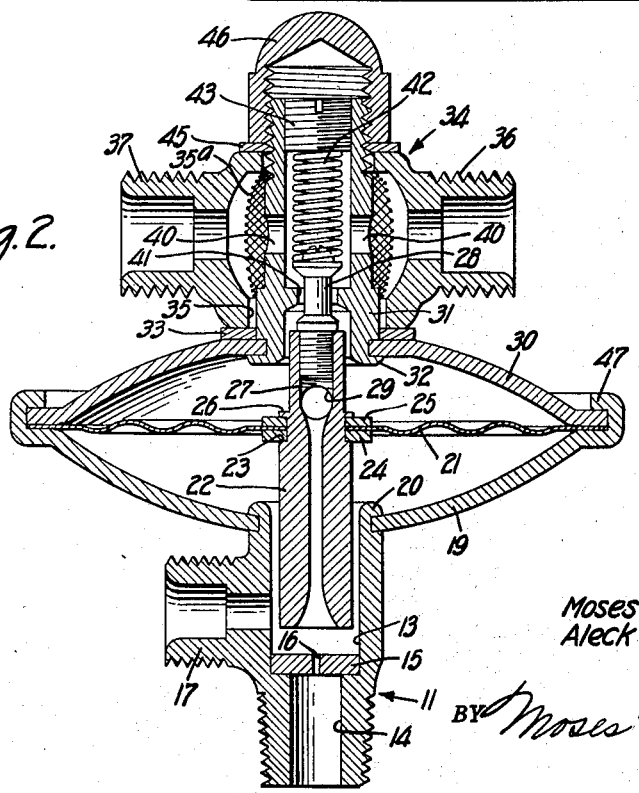

In the drawing forming part of this specification:

Figure 1 is a fragmentary, diagrammatic elevation, partly in section, showing the present instrument applied to the lubricating system of a motor vehicle; and Figure 2 is a sectional elevation of the element of the instrument which is responsive to the viscosity of the lubricant and which controls the distant indicator.

In Figure 1 disclosure is made of a sump 1 having a gear pump 2 in the bottom thereof for feeding oil from the the sump through an upwardly extending pipe 3 and thence through branch pipes 4 and 5 to the various parts to be lubricated. In the branch pipe 4 there is interposed a device 6 responsive to the viscosity of the oil whereby oil pressure dependent upon the viscosity is transmitted through a tube 7 to an indicator head 8 mounted on the dashboard of the vehicle. The indicator head 8 is of usual construction, comprising a Bourdon tube, and a pointer 9 operated by the Bourdon tube and adapted to travel across a scale 10.

The viscosity measuring device comprises a fitting 11 threaded into the top 12 of the crankcase. This fitting has a large bore 13 in the upper portion thereof and a reduced bore 14 in the lower portion. A plug or washer 15 having a small orifice 16 therein is seated upon the shoulder formed at the juncture of the large and small bores of the fitting. The fitting is provided with a lateral nipple 17 adapted to be connected by union nut 18 with the tube 7 that runs to the indicator head 8. The upper end of the fitting 11 is initially of reduced external dimensions. A concavo-convex housing member 19 is placed upon this reduced upper end portion with the convex side turned downward and is permanently secured in place by upsetting the upper end of the fitting 11 to form a flange 20. The parts of the measuring device thus far described constitute the lower housing assembly unit.

The second assembly unit is the diaphragm unit. A flexible corrugated metal diaphragm 21 is supported marginally upon a flat annular marginal portion of the housing member 19. A tubular member 22 passes centrally through, and is carried by, the diaphragm 21. This tubular member 22 is provided with a shoulder 23. A washer 24 bears against this shoulder, the diaphragm 21 bears against the upper face of the washer 24, and a second washer 25 bears against the upper face of the diaphragm. The washer and diaphragm assembly is held permanently associated with the tubular member 22 in a manner to prevent leakage of oil past the joint by upsetting a portion of the tubular member to provide a flange 26 to bear forcibly downward against the clamping washer 25.

The bore of the tubular member 22 is enlarged and threaded at the upper end portion thereof, as shown at 27, and receives the threaded stem of a valve 28. Although referred to at this point the valve stem is not threaded into tubular member 22 until after the third assembly unit (to be described presently) has been associated with the other units. A port 29 is provided in the side of the tubular member in communication with the enlarged bore thereof just below the lower end of the valve stem. This port is situated above the diaphragm 21.

The third assembly unit is the upper housing unit and comprises an upper housing member 30 which fits upon a lower reduced end portion of a tubular member 31, and which is permanently secured to such tubular member by upsetting the lower end thereof to form a retaining flange 32.

In addition to the assembly units described, provision is made for a sealing gasket 33 which surrounds the tubular member 31 and rests upon the central top portion of the housing member 30. The upper end of the tubular member 31 is externally threaded. A fitting 34 is provided with an opening 35 in the bottom thereof large enough to pass freely over the tubular member 31, and a strainer 35a which surrounds it. The fitting 34 is held in place and clamped firmly against the sealing gasket 33 by the cap nut 46 which bears upon a sealing gasket 45 surrounding tubular member 31 and resting upon the top of fitting 34. The fitting 34 is provided with opposed, laterally extending nipples 36 and 37 adapted to be secured in the line 4 by union nuts 38 and 39. The tubular member 31 has openings 40 in the sides thereof and is also provided with an internal flange 41 to form a valve seat which the valve 28 is adapted to engage when the diaphragm 21 is displaced downwardly from the position shown in Figure 2.

In the completed instrument a calibrating spring 42 bears against the head of the valve 28, being maintained under the desired stress by an adjusting screw 43 which is threaded into the upper portion of the tubular member 31. The head of the valve 28 is provided with a slotted knob or boss which serves both as a guide for the calibrating spring 42 and as a means for screwing the valve into place with the aid of a screw driver.

In manufacturing the instrument the bottom housing assembly is put together, the diaphragm assembly is put together, and the upper housing assembly is put together. The diaphragm assembly is then positioned upon the bottom housing assembly and the upper housing assembly is positioned upon the diaphragm assembly. The marginal portion of the lower housing member 19 is then turned inward to form a clamping flange 47 overlying the marginal portion of the housing member 30. After this has been done the valve 28, spring 42, screw 43, gaskets 33 and 45, fitting 34, and cap 46 are properly assembled with the other parts in the relation already described. The entire device is then assembled in the lubricating system of the motor vehicle in the manner already illustrated and described.

The operation of the device is as follows:

Oil from the pump 2 travels up the pipe 3, through branch pipe 4 and into fitting 34. Most of the oil continues out the fitting to the continuation of pipe 4 for lubricating parts of the vehicle, but a portion of it enters the ports 40, passes downward through tubular member 31, past valve seat 41, to the upper of the two diaphragm chambers into which the diaphragm divides the housing 19, 30. The oil passes from this upper chamber through port 29 into the upper end of tubular member 22. It passes thence downward through the capillary bore of tube 22, suffering a considerable pressure drop because of the high frictional resistance of the restricted bore. Oil pressure acts on the upper and lower diaphragm chambers of the housing, the oil in the lower chamber being at a lower pressure than that in the upper chamber. The oil also fills the chamber in fitting 11 above the orifice 16, and the pressure in the lower chamber is impressed through the tube 7 upon the Bourdon coil. All of the oil which passes through the capillary bore 15 of tube 22 passes out through orifice 16 and drops back into the crankcase.

Because of the difference between the characteristic response of an orifice and that of a capillary tube to the viscosity of the oil, the pressure applied to the Bourdon coil will vary according to the viscosity.

A substantially constant pressure difference is maintained between the upper and lower chambers of the housing 19, 30, because of the fact that the valve 28 will always close when the diaphragm has been distorted to a predetermined extent. The pressure difference acting on the oil to force it through the capillary bore is therefore maintained substantially constant, and is independent of the source pressure and of the viscosity of the oil. The rate of flow through the capillary bore varies, however, in accordance with the viscosity of the oil, that is, the oil flows through more slowly when it is more viscous. If the pressure acting upon the orifice 16 were maintained constant, the oil would also flow through the orifice more slowly when the oil is more viscous, but the viscosity would have less influence upon the rate of flow through the orifice than it does upon the rate of flow through the capillary bore. Since the orifice is compelled, however, to carry the oil away as fast as it enters through the capillary bore, the pressure in the lower diaphragm chamber varies in accordance with the viscosity of the oil, being high when the oil is thin, and low when the oil is viscous, and being at all times a function of viscosity. The indicator head is accordingly graduated in terms of viscosity of the oil, so that the operator is kept informed at all times of the condition of the crankcase oil in his motor.

The provision of the calibrating spring 42 is regarded as an important feature of the invention, since it makes possible ready adjustment for variation in the manufacture of the parts, and particularly for variations which unavoidably occur in the manufacture of the diaphragms.

The fact that the tubular member 22 is carried by and movable with the diaphragm is also regarded as a feature of substantial importance in bringing about a simple and economical construction.

Fitting 34 is so arranged as to provide for a large enough flow of oil to maintain by conduction all parts of the device at approximately the temperature of the oil in the lubricating system. The device as a whole being comparatively small and the fitting 34 being relatively large, heat loss by radiation and convection will be a small factor, and heat conduction to and through the component metal parts and the oil bodies within the device will be comparatively large and rapid. This is an important feature, since it is desirable to know the condition of the oil at operating temperature rather than at some radically lower temperature.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be utilized.

We claim:

1. In a viscosimeter, a housing, a diaphragm dividing the housing into a pair of diaphragm chambers, a valve controlled by the diaphragm for controlling the admission of oil to the first of said chambers, a friction tube carried by and extending through the center of said diaphragm for conducting oil from the first to the second of said chambers, means providing an orifice beyond the friction tube, indicating means and means whereby said indicating means is made responsive to the pressure existing between the orifice and the friction tube.

2. In a viscosimeter, in combination, a housing, a diaphragm dividing the housing into a pair of diaphragm chambers, a friction tube carried by and extending through the diaphragm to conduct liquid from the first to the second of said chambers, a valve carried by the friction tube, and seating means cooperating therewith for controlling the admission of liquid to said first chamber, and means providing an orifice for controlling the escape of liquid from said second chamber.

3. In combination, a liquid conduit, a viscosimeter for by-passing a small proportion of the liquid from the conduit and measuring the viscosity thereof, and an intake tube of substantial mass for the viscosimeter, said conduit being larger than said tube and said tube being enclosed in the conduit so that the entire body of liquid flows past it to warm the viscosimeter.

4. In combination, a liquid conduit, a viscosimeter for by-passing a small proportion of the liquid from the conduit and measuring the viscosity thereof, and heat conducting means mounted in said conduit adjacent the inlet of said viscosimeter for utilizing the heat of the entire contents of the conduit to maintain the viscosimeter at substantially the temperature of the oil in the conduit.

5. In a viscosimeter, means defining a pair of chambers, a movable wall between said chambers, a friction tube passing through the center of said movable wall for conducting liquid from the first to the second of said chambers, a valve carried by said movable wall and seating means cooperating therewith for controlling the admission of liquid to said first chamber, and means providing an orifice for controlling the escape of liquid from said second chamber.

6. In a viscosimeter, a pair of chambers, a yieldable member supported between said chambers, means for admitting liquid under pressure to one of said chambers, means supported by said yieldable member for conducting liquid from the first to the second of said chambers while subjecting it to a pressure drop, means carried by said yieldably supported member and cooperating with said liquid admitting means for controlling the admission of liquid to the first chamber, and means for controlling the escape of fluid from the second chamber.

MOSES E. CHENEY.
ALECK W. MESTON.